US012649463B1

(12) United States Patent
Kobilarov et al.

(10) Patent No.: US 12,649,463 B1
(45) Date of Patent: Jun. 9, 2026

(54) OBJECT RELEVANCE FILTERING WITH STATE INTERACTION SCORING

(71) Applicant: Zoox, Inc., Foster City, CA (US)

(72) Inventors: Marin Kobilarov, Baltimore, MD (US); Linjun Zhang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 307 days.

(21) Appl. No.: 18/228,461

(22) Filed: Jul. 31, 2023

(51) Int. Cl.
B60W 30/095 (2012.01)

(52) U.S. Cl.
CPC ... B60W 30/0956 (2013.01); B60W 2520/105 (2013.01); B60W 2530/201 (2020.02); B60W 2554/4042 (2020.02)

(58) Field of Classification Search
CPC ....... B60W 30/0956; B60W 2520/105; B60W 2530/201; B60W 2554/4042
See application file for complete search history.

(56) References Cited

U.S. PATENT DOCUMENTS

| | | | | | |
|---|---|---|---|---|---|
| 1,209,997 | A | * | 12/1916 | Ferguson | A61H 3/02 |
| | | | | | 135/73 |
| 9,950,708 | B1 | * | 4/2018 | Cullinane | B60W 30/09 |
| 12,275,431 | B1 | * | 4/2025 | Kobilarov | B60W 30/18159 |
| 2013/0054103 | A1 | * | 2/2013 | Herink | B60T 7/22 |
| | | | | | 701/65 |
| 2021/0110484 | A1 | * | 4/2021 | Shalev-Shwartz | G05D 1/0088 |
| 2023/0166764 | A1 | * | 6/2023 | Johnson | G06Q 10/047 |
| | | | | | 701/23 |

* cited by examiner

*Primary Examiner* — Daniel M. Robert
(74) *Attorney, Agent, or Firm* — Lee & Hayes, P.C.

(57) ABSTRACT

Systems and techniques for whether to associate predicted object trajectories of objects detected in an environment with candidate vehicle trajectories are described. A vehicle computing system may determine a vehicle occupancy state of a vehicle along a path of travel, determine, based at least in part on the predicted object trajectory, an object occupancy state of the object along the predicted object trajectory, determine a state interaction score for the vehicle occupancy state and the object occupancy state, determine, based at least in part on the state interaction score, a relevancy score representing a relevance of the predicted object trajectory to a candidate trajectory, and control the vehicle based at least in part on the relevancy score.

17 Claims, 5 Drawing Sheets

300

400 —↘

OBJECT RELEVANCE FILTERING WITH STATE INTERACTION SCORING

BACKGROUND

Various systems, such as planning systems for autonomous vehicles, may determine actions based on detected objects in an environment, such as by yielding to the objects, changing lanes to avoid the objects, paths to travel to remain on course to a planned destination, etc. in the example of autonomous vehicles. However, based on the number of objects within the environment, such systems may require a large amount of computing resources (e.g., memory, processing power, etc.) and/or an increased processing time to determine the actions thereby limiting performance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
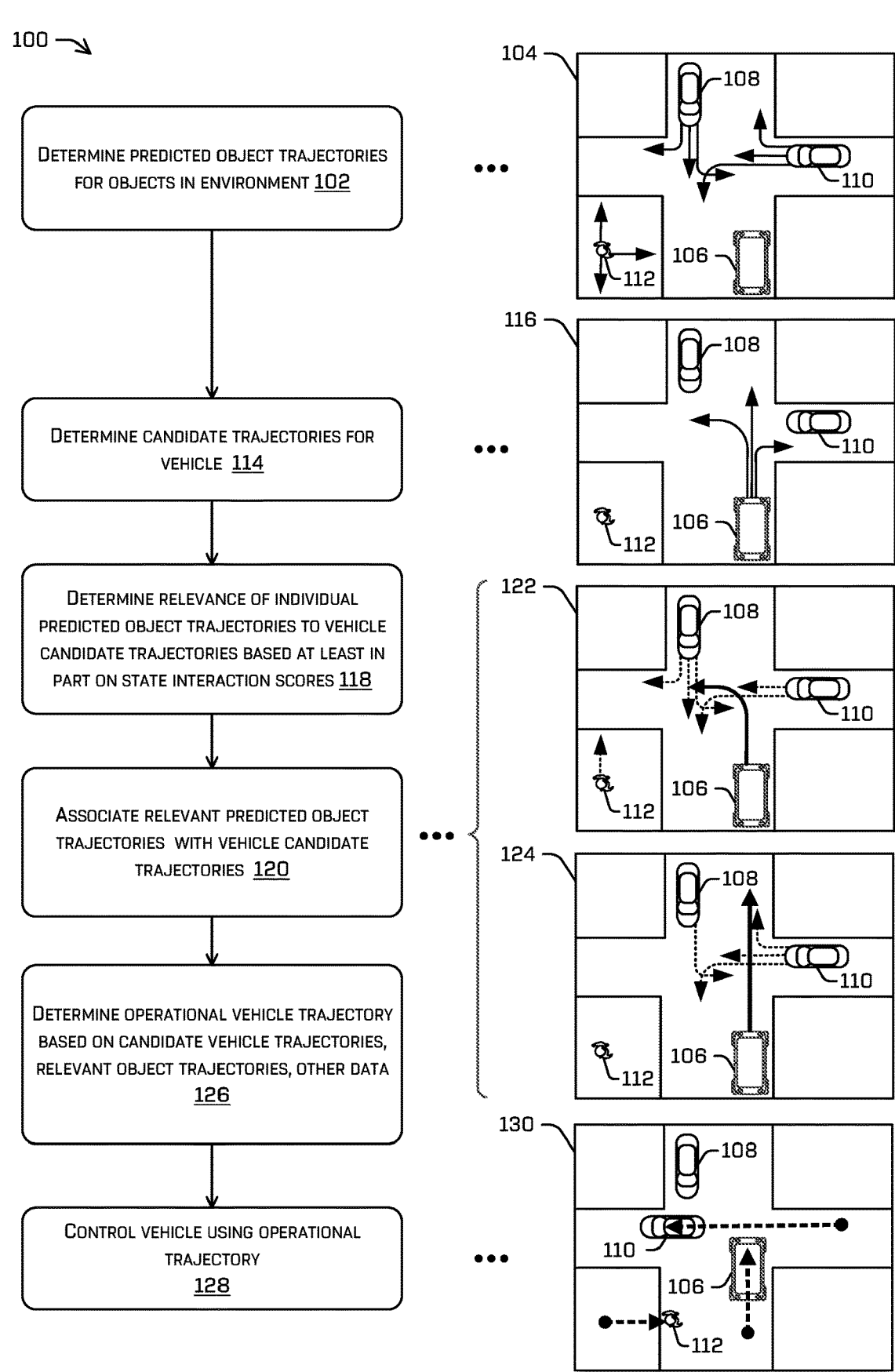
FIG. 1 is a pictorial flow diagram illustrating an example process for determining predicted object trajectories and relevant object trajectories in order to determine an operational trajectory for a vehicle, in accordance with examples of the disclosure.

Techniques for determining relevant objects based on predicted object behavior are discussed herein. As described herein, candidate vehicle trajectories may be determined for a vehicle, such as an autonomous vehicle, traversing an environment. In examples, candidate trajectories may be determined for particular purposes. For example, a candidate trajectory may include vehicle controls that may be implemented to control a vehicle along a planned path or route through an environment. Another example candidate trajectory may include vehicle controls that may be implemented to control a vehicle to return to an intended position or location in an environment in response to detecting that the vehicle is not in an expected position and/or location. Another example candidate trajectory may include vehicle controls that may be implemented to control a vehicle around or to otherwise avoid an object or obstacle detected in an environment. In various examples, a vehicle computing system may determine, generate, receive, maintain, or otherwise have available multiple candidate trajectories associated with various conditions that may be used to control the vehicle through an environment. While traversing an environment, a vehicle computing system may determine an operational trajectory from among and/or between available candidate trajectories for use in controlling the vehicle. The determination of an operational trajectory may be based on one or more factors, such as the detection of objects within the environment. Because such factors may be updated regularly and/or substantially continuously, the operational trajectory may also be determined and/or updated regularly and/or substantially continuously to maintain safe and comfortable operation of the vehicle through the environment.

A vehicle traversing an environment may identify or otherwise detect one or more objects within the environment. A vehicle computing system configured at the vehicle may determine one or more predicted object trajectories for these individual objects. The vehicle computing system may determine the operational trajectory based on predicted object trajectories of one or more objects within the environment. For example, the vehicle computing system may determine whether and how an object in the environment may intersect with or otherwise interact with a candidate trajectory. Based on this information, the vehicle computing system may determine whether to use that candidate trajectory to control the vehicle. For instance, the vehicle computing system may determine, based on a predicted object trajectory for a particular object, that the particular object has a high probability (e.g., above a threshold probability) of intersecting with the vehicle if the vehicle is controlled according to a particular candidate trajectory. Therefore, the vehicle computing system may assign a low score or weighting to that particular candidate trajectory in the operational trajectory selection process or otherwise take one or more actions to reduce a likelihood that the particular candidate trajectory is determined as an operational trajectory (e.g., a candidate trajectory which has been selected and is currently being executed).

In examples, objects within an environment and/or their predicted object trajectories may or may not have the potential to affect one or more candidate trajectories. For example, a dynamic object in an environment, such as another vehicle, may be traveling parallel to a vehicle and, based on a first of the dynamic object's predicted object trajectories, will continue to travel parallel to and past the vehicle. That first predicted object trajectory may have no impact on a first candidate trajectory for the vehicle that controls the vehicle to continue traveling in its current direction without turning. However, the first predicted object trajectory for the dynamic object may potentially affect a second candidate trajectory for the vehicle that includes one or more controls that cause the vehicle to turn into the predicted path of the dynamic object represented in the first predicted object trajectory. Likewise, a second predicted object trajectory for the dynamic object that includes a predicted path of the dynamic object that intersects the path of the vehicle as represented in the first candidate trajectory for the vehicle may likely affect the first candidate trajectory. In these examples, knowledge of the first predicted object trajectory for the dynamic object may provide value to the evaluation of the second candidate trajectory but may not provide value to the evaluation of the first candidate trajectory.

In examples, a relevance of predicted object trajectories for one or more objects may be determined in relation to one or more candidate vehicle trajectories. The relevance of a predicted object trajectory to a particular candidate vehicle trajectory may be represented as a relevance score. Based on these relevance scores, a vehicle computing system may include or filter (e.g., disregard and/or remove from further consideration) predicted object trajectories from data associated with candidate vehicle trajectories. Because data stored for an individual candidate vehicle trajectory may include data associated with other potentially impacting factors, such as objects in the environment and their predicted object trajectories, by filtering out data that is unlikely to impact operation of the vehicle from candidate trajectory data, the disclosed systems and techniques may improve the efficiency of a vehicle computing system by reducing the memory and processing requirements associated with determining trajectories for the associated vehicle that are irrelevant (e.g., below a threshold relevance) to planned operation of the vehicle. The techniques described herein also maintain and improve vehicle safety and driving efficiency by ensuring that the relevant objects and driving scenarios are being timely evaluated by the vehicle, thereby generating more efficient and accurate trajectories.

When a vehicle, such as an autonomous vehicle, is operating within an environment, the vehicle may receive sensor data (e.g., captured by sensors of the vehicle or received from remote sensors (e.g., other vehicles or infrastructure)) associated with the surrounding environment. The sensor data, which may include image data, radar data, lidar data, etc., may be analyzed by the autonomous vehicle to detect and classify various objects within the operating environment. An autonomous vehicle may encounter various different types of objects within different driving environments, including dynamic objects that are capable of movement (e.g., vehicles, motorcycles, bicycles, pedestrians, animals, etc.) and/or static objects (e.g., buildings, road surfaces, trees, signs, barriers, parked vehicles, etc.). In order to safely traverse driving environments, an autonomous vehicle may include various components configured to detect objects and determine attributes of the detected objects. In some examples, a perception component of the autonomous vehicle may include various models and/or components to detect objects based on sensor data, in addition to classifying the objects. One or more prediction components of the autonomous vehicle may use the object detection and classification to generate predicted information (e.g., trajectories, likelihoods associated with trajectories, etc.) associated with the objects.

In some examples, the vehicle may identify relevant objects within an environment based on the predicted information. The vehicle may identify potential interactions (e.g., direct and indirect) between a candidate trajectory that may be followed by the vehicle and the predicted object trajectories of objects within the environment. Based on identifying the potential interactions, the vehicle may determine a respective relevance score for individual (e.g., some or all) predicted object trajectories for individual (e.g., some or all) candidate vehicle trajectories.

When determining relevant objects and their associated trajectories within an environment, a vehicle computing system may determine one or more predicted object trajectories. When evaluating candidate vehicle trajectories to determine an operational trajectory for a vehicle, the vehicle computing system may associate predicted object trajectories with individual candidate vehicle trajectories so that individual candidate trajectory data includes adequate information related to objects in the environment. However, in many examples, one or more of the predicted object trajectories may be incapable of or unlikely to affect one or more of the candidate vehicle trajectories. For example, a particular predicted object trajectory may not intersect a particular candidate vehicle trajectory (e.g., if the trajectories are followed, the vehicle and the object are incapable of or unlikely to intersect). Consequently, a particular predicted object trajectory may or may not be relevant to a particular candidate vehicle trajectory. Data storage resources may be wasted by storing data associated with irrelevant predicted object trajectories with a candidate vehicle trajectory, and data processing resources may further be wasted processing irrelevant predicted object trajectory data in evaluating the candidate vehicle trajectory in determining an operational trajectory for the vehicle.

To address the technical problems and inefficiencies of storing and processing data that may be irrelevant to candidate vehicle trajectories, the techniques described herein include using a relevancy filter-based system (which also may be referred to as a "relevance filter") to determine relevant predicted object trajectories for to associated with one or more candidate vehicle trajectories for subsequent processing. Initially, the relevance filter, for example, as implemented and/or executed by a vehicle computing system, may receive a candidate trajectory or path for a vehicle (e.g., an autonomous vehicle) to follow within an environment. As non-limiting examples, such candidate trajectories may be associated with one or more proposed actions (e.g., continue along a path, merge left, merge right, slow down, etc.) for the vehicle to take at a particular step in time. In at least some such examples, the actions may be limited or otherwise constrained based on static and or dynamic objects in an environment, a desired destination point, and the like. In some examples, the path may be based on a combination of a current position and/or location of the vehicle, the vehicle dynamics, and/or map data. In at least some examples, such proposed actions may be associated with one or more various future points in time as may be used in, for example, a tree search in order to determine an overall optimized trajectory for control of the vehicle. Additional details for how such a tree may be created may be found in the U.S. patent application Ser. No. 17/394,334 entitled "Vehicle Trajectory Control Using a Tree Search" filed on Aug. 4, 2021, the entire contents of which are hereby incorporated by reference.

A perception component may detect and classify one or more objects within the environment. A prediction component may additionally determine a number of predicted object trajectories associated with the detected object(s). In some examples, the perception and prediction components may send information regarding the objects(s) (e.g., object classification, predicted object trajectories, likelihoods of individual trajectories, etc.) to the relevance filter.

In some examples, the vehicle computing system may generate importance scores for predicted object actions or predicted object trajectories (hereinafter predicted object trajectories) for one or more candidate vehicle trajectories. Importance scores for predicted object trajectories may be based on state interactions scores between states (e.g., occupied positions) of the object and the vehicle. For example, the states may be estimations of where the autonomous vehicle and objects may travel based on the autonomous vehicle following the candidate trajectory and the objects following the predicted object trajectories. In some examples, states may be sampled using arc length-based sampling along the predicted object trajectory and along the candidate trajectory (e.g., using the object length and/or vehicle length). For example, states may be determined as occupied points along the arc of the trajectory based on the length of the object for predicted object trajectories or the length of the vehicle for candidate vehicle trajectories.

However, variations such as the use of other arc lengths for sampling would be apparent to one of ordinary skill in the art in view of this disclosure.

As discussed in more detail below, the interactions scores between states may be determined based at least in part on a time until interaction, a distance between the vehicle and the object while interacting and state weights.

In some examples, the vehicle computing system may determine a range of times during which the vehicles or objects may occupy the states based on the autonomous vehicle's dynamics and/or capabilities (e.g., maximum and minimum accelerations, maximum and minimum velocities, current velocity, current steering angle and/or heading, maximum and/or minimum steering angles/rates, etc.). The vehicle computing system may also determine a range of time during which individual objects detected in the environment may occupy states based on the predicted object trajectories of such objects.

In some examples, the states and interaction scores between states may be determined for a period of time (e.g., 5 seconds, 8 seconds, 10 seconds, etc.). This portion of time may be based on a "decision horizon" associated with the vehicle's computing system that may be a period of time into the future for which the vehicle computing system may be configured to predict and determine trajectories.

Using the data associated with the states, the vehicle computing system may determine an interaction score for individual pairs of states in a state array for the set of candidate trajectories and predicted object trajectories. In various examples, a null or zero interaction score for a particular pair of states may indicate no relevancy to the vehicle and/or a particular candidate trajectory. In some examples, the vehicle computing system may determine whether a pair of states are associated with a same object. For example, if the two states of the pair of states are both associated with the vehicle, they are not relevant to determining whether to use the associated candidate vehicle trajectory as an operational trajectory. Similarly, if the two states of the pair of states are both associated with the same object, they are not relevant to determining whether to use the associated candidate vehicle trajectory as an operational trajectory. The vehicle computing system may in turn assign a zero or null interaction score to this pair of states.

In some examples, the association of the vehicle with at least one state may be a threshold condition for determining whether a pair of states is relevant. For example, if both states in a pair of states are associated with the vehicle, they may be determined as not relevant to determining whether to use the associated candidate vehicle trajectory as an operational trajectory as described above. If neither state in a pair of states is associated with the vehicle, they may be determined as not relevant to determining whether to use the associated candidate vehicle trajectory as an operational trajectory because the vehicle is not involved in either. If one state in a pair of states is associated with the vehicle, they may be determined to be relevant to determining whether to use the associated candidate vehicle trajectory as an operational trajectory because there is at least the possibility of intersection between the object and the vehicle. In other examples, the association of the vehicle with a state may be excluded from a relevancy determination.

If the two states of the pair of states are not associated with the same object (and/or, in some examples, one of the states is associated with the vehicle and one is not), the vehicle computing system may determine an interaction score based at least in part on a time until the interaction (e.g., the earliest times of arrival for the object and the vehicle at the respective states), a distance between the states while interacting and one or more state weights. Discussion of an example determination of an interaction score is provided below with respect to FIG. 3. In some examples, the vehicle computing system may assign a zero or null interaction score to a pair of states that are more than a threshold distance apart. Additionally or alternatively, the vehicle computing system may assign a zero or null interaction score to a pair of states that when the interaction score is below a threshold value.

The relevancy score for a predicted object trajectory may be set to the highest relevancy score associated with the predicted object trajectory for any pair of states in the predicted object trajectory and a candidate trajectory, thereby ensuring that any object relevancy is accentuated to improve safety considerations in determining an operational trajectory for a vehicle. In other examples, the vehicle computing system may determine an aggregate relevancy score for pairs of states of an individual predicted object trajectory with the candidate vehicle trajectories. In other examples, the vehicle computing system may determine an average relevancy score for a predicted object trajectory based on averaging the interaction scores for the pairs of states for that predicted object trajectory. In some examples, the vehicle computing system may average the non-zero interaction scores of the pairs of states for the predicted object trajectory, while in other examples, the vehicle computing system may average all (e.g., zero and non-zero) interaction scores for the predicted object trajectory.

The vehicle computing system may utilize the determined relevancy score for a particular predicted object trajectory to determine if the predicted object trajectory should be associated with the candidate vehicle trajectory. If so, the vehicle computing system may associate the predicted object trajectory data with the candidate vehicle trajectory and process such data to determine whether the candidate vehicle trajectory should be used as an operational trajectory for the vehicle.

Once relevant objects have been determined, additional computational resources may be dedicated to performing an optimization over the tree search, using active prediction systems for such objects (e.g., as may be described in U.S. patent application Ser. No. 17/535,357 entitled "Encoding Relative Object Information into Edge Features" filed on Nov. 24, 2021, the entire contents of which are hereby incorporated by reference) to better account for motion of such objects in response to vehicle actions, and the like.

The systems and techniques described herein may be directed to leveraging trajectory data, vehicle operational data, object detection data, and/or other data to enable a vehicle, such as an autonomous vehicle, to more accurately determine a vehicle trajectory that may account for relevant objects in an environment for improved vehicle control and operational safety, facilitating safer navigation through an environment and increased vehicle resources utilization efficiency. In particular examples, the systems and techniques described herein can utilize data structures containing data representing a region of an environment, predicted object trajectories of objects in the environment, candidate vehicle trajectories, occupancy times and/or ranges of time, and/or vehicle and/or object headings and/or positions. By using the relevancy filtering techniques described herein to more accurately determine relevant object data for a candidate trajectory that may be used as an operational trajectory, the examples described herein may result in increased safety and accuracy of vehicle control, especially vehicle operations proximate to objects in an environment, thereby allowing an autonomous vehicle to more safely operate in the environment.

For example, by using the relevancy filtering techniques described herein, the vehicle computing system may distinguish between predicted object trajectories with the same path in the environment but with different longitudinal intents. For example, by using the relevancy filtering techniques described herein, the vehicle computing system may distinguish the relevancy of three predicted object trajectories which follow the same path where one predicted object trajectory includes a constant speed, one predicted object trajectory includes the object decelerating, and one predicted object trajectory includes the object accelerating. As discussed below, the relevancy of such predicted object trajectories with different longitudinal intents may differ significantly. As such, by providing more accurately determine relevance for predicted object trajectories, the examples described herein may result in increased safety and accuracy of vehicle control.

Further, the techniques described herein may be faster and/or more robust than conventional techniques, as they may increase the ability of an autonomous vehicle to safely navigate in an environment and more smoothly implement vehicle control operations, which may, in turn, provide more comfortable rider experiences. That is, techniques described herein provide a technological improvement over existing object detection and vehicle trajectory determination technology.

The techniques described herein may also improve the operation of computing systems and increase resource utilization efficiency. For example, computing systems, such as vehicle computing systems, may more efficiently perform trajectory evaluations and operational trajectory determinations using the techniques described herein because the disclosed examples may reduce the amount of data needed to represent candidate vehicle trajectories by reducing or eliminating the representation of objects and/or predicted object trajectories that may be irrelevant to candidate vehicle trajectories. Additionally, or alternatively, such resources may be used to improve predictions and other determinations that would have otherwise been dedicated to irrelevant objects. Furthermore, computing systems, such as vehicle computing systems, may more efficiently perform trajectory determination operations and the calculations required to determine an operational trajectory by maintaining relevant object trajectory data and not retaining irrelevant object trajectory data, thereby requiring fewer data storage resources and less processing to determine evaluate candidate trajectories and determine an operational trajectory than would be required using conventional techniques where an individual candidate trajectory may be associated with data represented any number of object trajectories that may not be relevant to the candidate trajectory.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of sensor data and processing with particular types of components, data and data structures as described herein can include any two-dimensional, three-dimensional, or multi-dimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like) or any combination of thereof.

FIG. 1 is a pictorial flow diagram of an example process 100 for determining an operational trajectory for use in controlling a vehicle based on candidate trajectories and predicted object trajectory relevancy. In examples, one or more operations of the process 100 may be implemented by a vehicle computing system, such as by using one or more of the components and systems illustrated in FIG. 5 and described below. For example, one or more components and systems can include those associated with vehicle computing device 504 of vehicle 502 illustrated in FIG. 5, processors 516 and/or 540, memories 518 and/or 542, perception component 522, planning component 524, prediction component 534, and/or relevant object trajectory determination component 526. In examples, the one or more operations of the process 100 may be performed by a remote system in communication with a vehicle, such as perception component 544, planning component 546, and/or relevant object trajectory determination component 548 illustrated in FIG. 5. In still other examples, the one or more operations of the process 100 may be performed by a combination of a remote system and a vehicle computing system. However, the process 100 is not limited to being performed by such components and systems, and the components.

At operation 102, a vehicle computing system may identify objects and determine associated predicted object trajectories. The vehicle computing system may detect objects within the environment based on sensor data. The vehicle computing system (e.g., one or more perception and/or prediction components configured therein) may also, or instead, determine one or more predicted object trajectories for the detected objects. Examples of techniques for predicting object trajectories for objects in an environment can be found, for example, in U.S. Pat. No. 11,169,531, issued Nov. 9, 2021, and titled "Trajectory Prediction on Top-Down Scenes," the contents of which is herein incorporated by reference in its entirety and for all purposes.

An example 104 illustrates a top-down view of an environment in which a vehicle 106 may be traveling. The vehicle 106 may be configured with a vehicle computing device configured to perform the relevancy filtering operations described herein. There may be several objects in the environment of example 104, including a vehicle 108, a vehicle 110, and a pedestrian 112. The vehicle 106 may detect these objects (vehicle 108, vehicle 110, and pedestrian 112) and determine (e.g., using a prediction component and/or relevant object trajectory determination component) one or more predicted object trajectories for the individual objects. These trajectories are represented in the example 104 as arrowed lines connected to the respective objects. For example, the vehicle 108 may have three predicted object trajectories, one associated with turning right, one associated with going straight and one associated with turning left. Vehicle 110 may have similar predicted object trajectories. Pedestrian 112 may also have predicted object trajectories that may include, for example, one for remaining on the sidewalk and two for crossing the street.

At operation 114, the vehicle computing system may determine one or more candidate trajectories for the vehicle. Of course, though described as trajectories herein, the description is not meant to be so limiting. In some examples, such alternates may be broadly be associated with one or more actions that the vehicle is capable of performing at an instant in time. As noted, a candidate trajectory may include vehicle controls that May be implemented to control a vehicle along a planned path or route through an environment, to control a vehicle to reach an intended position or location in an environment (e.g., return to a drivable region from a non-drivable region, return to a planned path after getting off of the planned path, etc.), to control a vehicle around or to otherwise avoid an object or obstacle detected in an environment (e.g., avoid a dynamic object, avoid a static obstacle, etc.), etc. In various examples, the vehicle computing system may generate, receive, or otherwise determine several candidate vehicle trajectories (e.g., as may be determined based on environmental data including static and dynamic data, rules of the road, determination of reaching a desired destination, etc.). The vehicle computing system may determine from among such multiple candidate vehicle trajectories an operational trajectory based on various factors, include, but not limited to, those described herein. As a non-limiting example, various actions may be explored as part of a tree search and a resultant trajectory may be determined as an optimization over a determined trajectory resulting from the tree search (e.g., incorporating environmental constraints, modeling reactions of objects to the vehicle following such a trajectory, and the like).

An example 116 illustrated the environment of example 104 illustrating the vehicle 106 with three candidate vehicle trajectories (actions) indicated in arrowed lines. As shown in this example, the candidate trajectories may include a left turn trajectory, a straight trajectory, and a right turn trajectory. In various examples, such actions/trajectories may be associated with an index and given an order. In some such examples, the order may be from one side of a lane to the other. As such, the indices may be "0" for turning left, "1" for continuing straight, and "2" for turning right, though any other ordered system is contemplated.

At operation 118, the vehicle computing system may determine the relevance of the individual predicted object trajectories. For example, the vehicle computing system may determine trajectory importance scores based on state interactions scores between states of objects in the individual predicted object trajectories and the vehicle in the candidate trajectories, as described in more detail herein. The vehicle computing system may then determine relevancy scores representing the relevance of one or more predicted object trajectories to one or more candidate vehicle trajectories. The vehicle computing system may then, for the individual candidate vehicle trajectories, determine whether a relevancy score(s) for a particular predicted object trajectory indicates that the object trajectory is relevant to a candidate vehicle trajectory (also as described in more detail herein). If a predicted object trajectory is relevant to a candidate vehicle trajectory, at operation 118, the vehicle computing system may, at operation 120, associate (e.g., in a data structure) the relevant predicted object trajectory with the corresponding candidate vehicle trajectory. This association and/or the representative data structure may then be used to determine a resultant or operational trajectory (e.g., which may result from performing an optimization of all selected actions over a tree search).

Examples 122 and 124 illustrate relevant predicted object trajectories for two different candidate vehicle trajectories.

In example 122, the left turn candidate vehicle trajectory (solid arrow) is shown for vehicle 106. The trajectories shown for the objects (vehicle 108, vehicle 110, and pedestrian 112) (dashed arrows) illustrate the predicted object trajectories that may be relevant to the left turn candidate vehicle trajectory for vehicle 106. As can be seen in this example, all three predicted object trajectories for the vehicle 108 from example 104 are shown as relevant to the left turn candidate vehicle trajectory for vehicle 106. This is because these trajectories individually raise a possibility of an intersection of vehicle 108 with vehicle 106 should vehicle 106 follow its left turn candidate vehicle trajectory. For vehicle 110, however, only its left turn and straight predicted object trajectories are relevant because if the vehicle 110 were to follow its right turn trajectory (shown in example 104), it may be very unlikely to intersect the vehicle 106 controlled along its left turn candidate vehicle trajectory. Likewise, only the predicted object trajectory that has the pedestrian 112 crossing the street onto which the vehicle 106 may be turning were it to follow its left turn candidate vehicle trajectory is relevant to that candidate vehicle trajectory.

Referring now to example 124, the straight candidate vehicle trajectory (solid arrow) is shown for vehicle 106. The trajectories shown for the objects (vehicle 108, vehicle 110, and pedestrian 112) (dashed arrows) illustrate the predicted object trajectories that may be relevant to the straight candidate vehicle trajectory for vehicle 106. As can be seen in this example, all three predicted object trajectories for the vehicle 110 from example 104 are shown as relevant to the straight turn candidate vehicle trajectory for vehicle 106. This is because these trajectories individually raise a possibility of an intersection of vehicle 108 with vehicle 106 should vehicle 106 follow its straight candidate vehicle trajectory. For vehicle 108, however, only its left turn predicted object trajectory is relevant because if the vehicle 110 were to follow its right turn trajectory or straight trajectory (shown in example 104), it may be very unlikely to intersect the vehicle 106 controlled along its straight candidate vehicle trajectory. Likewise, none of the predicted object trajectories associated with the pedestrian 112 are relevant to straight candidate vehicle trajectory for the vehicle 106.

At operation 126, based on the candidate vehicle trajectories, and those predicted object trajectories determined to be relevant thereto and/or any other factors that may be used to determine an operational trajectory, the vehicle computing system may determine an operational trajectory for the vehicle (e.g., a candidate trajectory that has been selected and is currently being executed). At operation 128, the vehicle computing system may control the vehicle through an environment based on this operational trajectory.

An example 130 illustrates the vehicle 106 being operated by using its straight candidate vehicle trajectory as its operational trajectory. As can be seen in this example, the vehicle 106 was operated to allow the vehicle 110 to cross in front of it (following its straight predicted object trajectory) and vehicle 108 remains stopped at the intersection. The pedestrian 112 have begun crossing the street, with no effect on the operational trajectory of the vehicle 106 (its straight candidate vehicle trajectory).

Figures 2A, 2B:
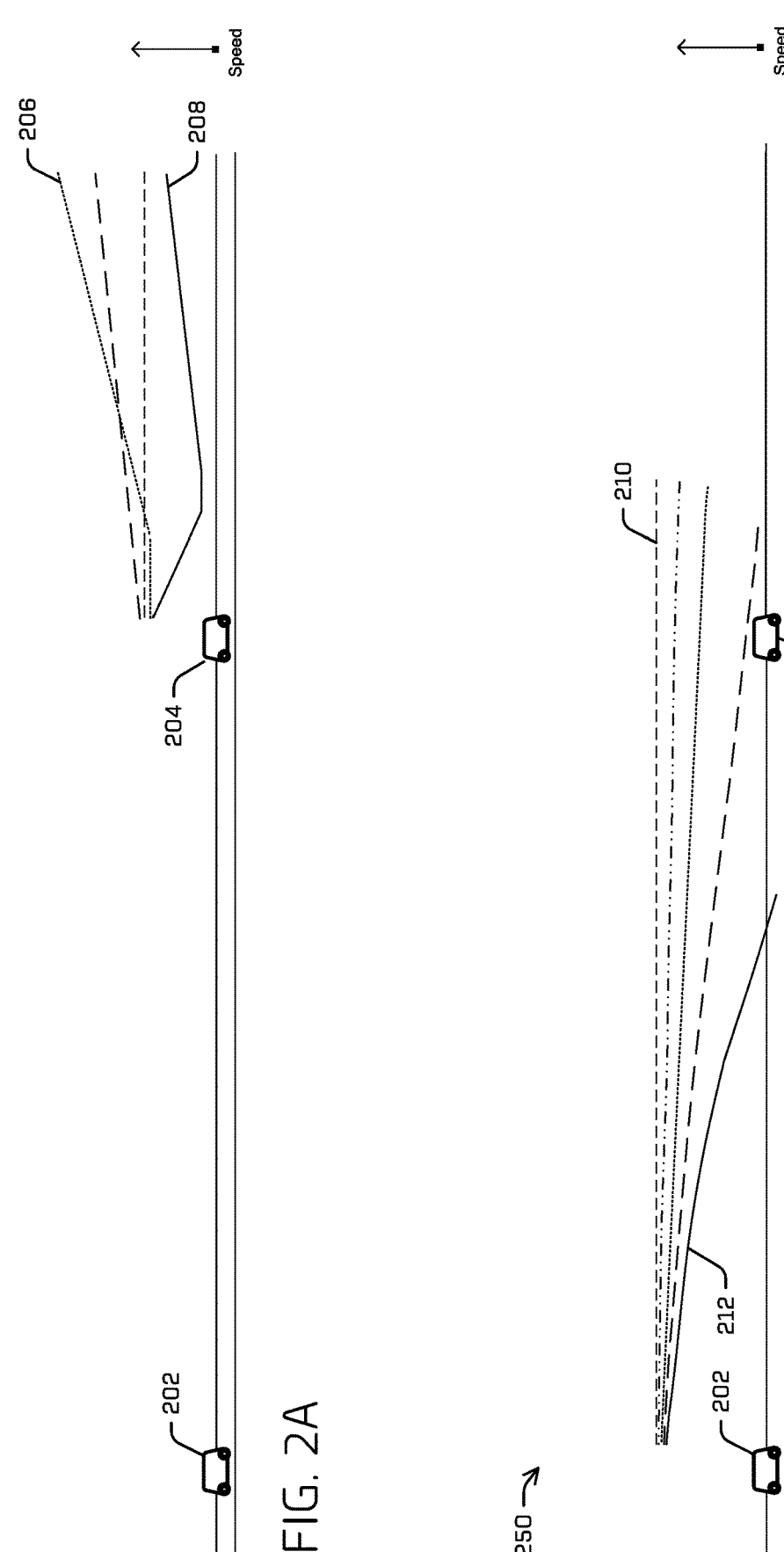
FIGS. 2A and 2B illustrate diagrams which illustrate the operation of the relevance filter with regard to predicted object trajectories with the same path but different longitudinal intents, in accordance with examples of the disclosure.

FIGS. 2A and 2B illustrate diagrams 200 and 250 which show the operation of the relevance filter with regard to predicted object trajectories with the same path but different longitudinal intents. More particularly, FIGS. 2A and 2B illustrate an environment in which a vehicle 202 is following behind another vehicle 204. As illustrated, the vehicle computing system of the vehicle 202 as determined a set of predicted object trajectories for the vehicle 204 including predicted object trajectory 206 and predicted object trajectory 208. In the illustrated example, the predicted object trajectories follow a straight path in the current direction of travel but include different longitudinal intents which result in different speeds of travel for the vehicle 204. In particular, in the predicted object trajectory 206, the vehicle 204 is predicted to accelerate, which would increase the distance between vehicle 202 and 204 if vehicle 202 does not change its speed of travel. In predicted object trajectory 208, the vehicle 204 sharply decelerates to a near stop before accelerating to its current speed again.

As illustrated in FIG. 2B, the vehicle computing system of vehicle 202 may generate a set of candidate trajectories including candidate trajectory 210 and candidate trajectory 212. In a vehicle computing system that does not take into account longitudinal intents, a relevance filter may select predicted object trajectory 206 for use in choosing a candidate trajectory. In such case, the vehicle computing system may select candidate trajectory 210 because the candidate trajectory selection process may not consider vehicle 204 as relevant to the vehicle 202 because the process expects the distance between the vehicles to increase. However, should the vehicle 204 operate as shown for predicted object trajectory 208 by executing a rapid deceleration, the use of candidate trajectory 210 may be unsafe. In examples according to this disclosure, by utilizing occupancy weight and state interactions scores to determine relevant scenarios, the relevance filter may operate to select the predicted object trajectory 208 as the most relevant (e.g., for safety reasons). As such, because the predicted object trajectory 208 is included in the selection of the operational trajectory from the candidate trajectories, the vehicle computing system may select the candidate trajectory 212 as the operational trajectory and exclude candidate trajectory 210 as potentially unsafe.

Figure 3:
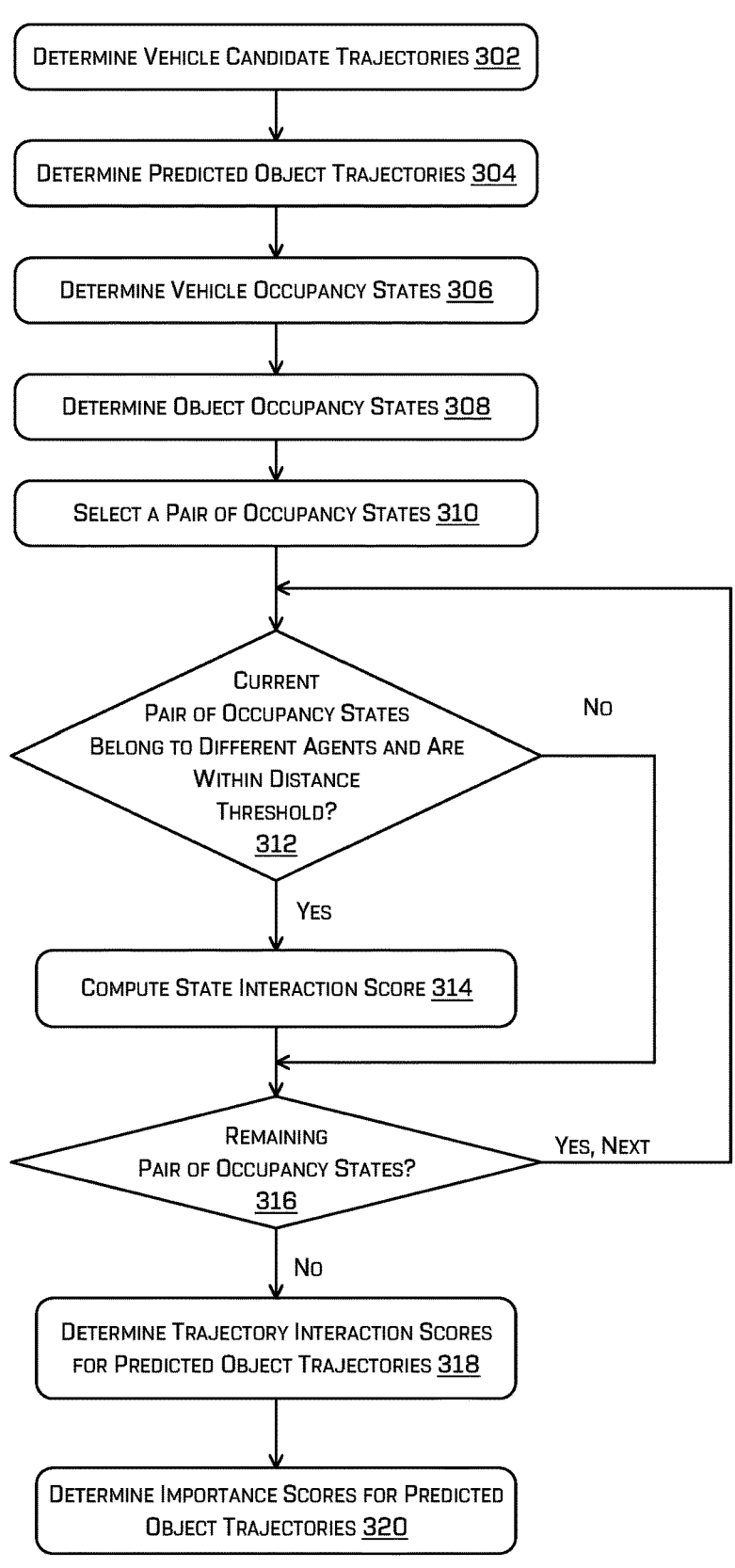
FIG. 3 a flow diagram illustrating an example process for determining the relevance of predicted object trajectories to one or more candidate vehicle trajectories, in accordance with examples of the disclosure.

FIG. 3 is flow diagram of an example process 300 for determining the relevance of predicted object trajectories to one or more candidate vehicle trajectories. In examples, one or more operations of the process 300 may be implemented by a vehicle computing system, such as by using one or more of the components and systems illustrated in FIG. 5 and described below. For example, one or more components and systems can include those associated with vehicle computing device 504, processors 516 and/or 540, memories 518 and/or 542, perception component 522, planning component 524, prediction component 534, and/or relevant object trajectory determination component 526. In examples, the one or more operations of the process 300 may be performed by a remote system in communication with a vehicle, such as perception component 544, planning component 546, and/or relevant object trajectory determination component 548 illustrated in FIG. 5. In still other examples, the one or more operations of the process 300 may be performed by a combination of a remote system and a vehicle computing system. However, the process 300 is not limited to being performed by such components and systems, and the components.

At 302, the vehicle computing system may determine vehicle candidate trajectories. Then, at 304, the vehicle computing system may determine predicted object trajectories. Operations 302 and 304 may be performed as discussed above with regard to operations 102 and 114 of FIG. 1.

At 306, the vehicle computing system may determine one or more vehicle occupancy states. Then, at 308, the vehicle computing system may determine one or more object occupancy states. The determination of the vehicle occupancy states and object occupancy states is discussed below with respect to FIG. 4.

Figure 4:
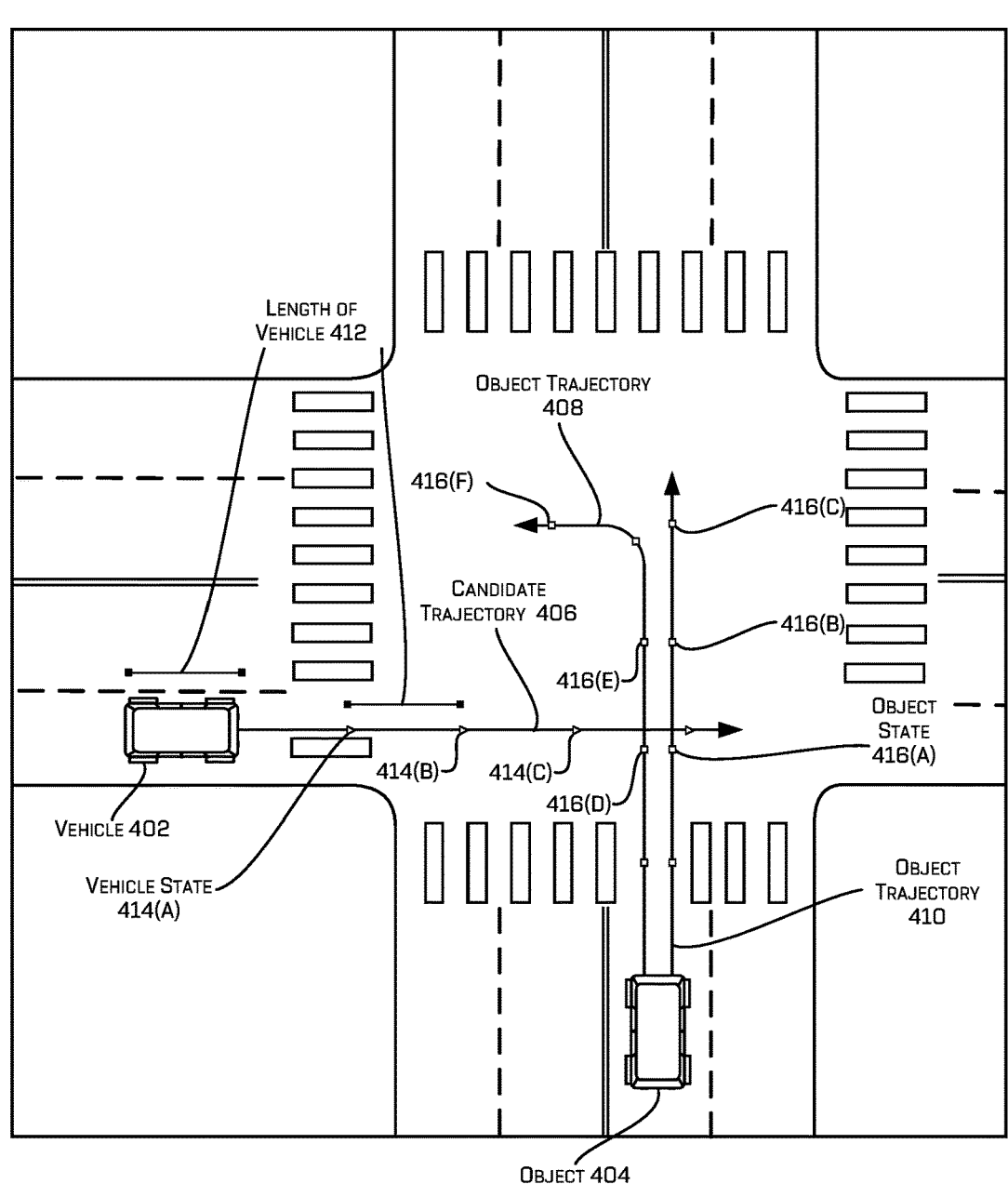
FIG. 4 illustrates an example environment for which a relevance filter has determined states for evaluating the relevance of predicted object trajectories to a candidate trajectory of a vehicle in the environment, in accordance with one or more examples of the disclosure.

FIG. 4 illustrates an example environment 400 for which a relevance filter has determined states for evaluating the relevance of predicted object trajectories to a candidate trajectory of a vehicle in the environment, in accordance with one or more examples of the disclosure. As illustrated, a vehicle 402 and an object 404 (also a vehicle) are meeting in an intersection. The vehicle computing system of the vehicle 402 may determine the relevance of object trajectory 408 and object trajectory 410 to the candidate trajectory 406 using occupancy states.

As discussed above, the vehicle computing system may determine vehicle occupancy states 414(A)-(D) along the arc of the candidate trajectory 406 and object occupancy states 416(A)-(F) along the arcs of the predicted object trajectories 408 and 410. As illustrated, the occupancy states may be sampled using arc length-based sampling with an arc length equal to the length of the associated vehicle or object of the trajectory. For example, the length of the vehicle 412 may be utilized in sampling vehicle occupancy states 414 from the candidate trajectory 406 such that the vehicle occupancy states 414 may be spaced by an amount equal to the length of the vehicle 412. Of course, while arc length sampling using the length of the associated vehicle or object is used in the illustrated example, one of ordinary skill in the art would understand that other occupancy state sampling criteria may be used. For example, a standard arc length may be used, the vehicle length may be used for both the vehicle occupancy states and the object occupancy states, a temporal spacing (e.g., associated with every 1, 2, 3, or more second or fraction thereof), or another selection method may be used. Additionally or alternatively, though linear spacings are depicted, the description is not meant to be so limiting. For instance, spacings may scale in time and/or space and/or be related to an amount of uncertainty in the prediction (which, in some examples, may be a function of time).

For each occupancy state of the vehicle, a time range ($t_{min}$, $t_{max}$) may be estimated by based on the maximum acceleration and maximum deceleration of the vehicle between the current position and the position of the occupancy state, while also considering the speed limit and/or other factors such that the minimum and maximum time indicate the range of times the vehicle or object may reach a given state.

The time range ($t_{min}$, $t_{max}$) for the occupancy states of the objects may be estimated in a similar manner to the vehicle or can be provided by a prediction module of the vehicle computing system.

The vehicle computing system may determine an occupancy state weight for each occupancy state of the object trajectories. In some examples, the occupancy state weight may be based on a relationship between the sampling arc length and the predicted speed at the occupied position. For example, the occupancy state weight may be given by:

$$\omega = \frac{\Delta s}{v + \epsilon}$$

where $\Delta s$ is the sampling arc length, v denotes a predicted speed of either the vehicle or the object at the occupied position, and e is a small value (e.g., 0.001) in case that the object is stationary in order to prevent singularities. In some examples, the vehicle computing system may clip the weight within boundaries, $w_{min}$ and $w_{max}$ (e.g., $w_{min}=1$, $w_{max}=80$). Further, the occupancy state weights assigned to the occupancy states of the vehicle may be an identity weight, (e.g., w=1).

Returning to FIG. 3, the vehicle computing system may then determine state interaction scores for pairs of occupancy states of the object trajectories and/or the candidate vehicle trajectories.

More particularly, at 310, the vehicle computing system may select a pair of occupancy states that have not been processed for a state interaction score. In some examples, the selection of occupancy states may be for combinations of vehicle occupancy states and object occupancy states. In other examples, the pairs may include combinations of object occupancy states. In other examples, operations 312 and 314 may be performed in parallel for all or batches of combinations of occupancy states. For example, for n occupancy states, the vehicle computing system may evaluate the $n^2$ state interaction scores in parallel, for example, on a graphics processing unit.

At 312, the vehicle computing system may determine whether the current pair of occupancy states belong to different agents (e.g., not the same vehicle or object) and are located within a distance threshold from one another. If so, the process may continue to 314. Otherwise, the process may continue to 316.

At 314, the vehicle computing system may determine a state interaction score for the current pair of occupancy states. Interaction scores between a pair of occupancy states may be determined based at least in part on factors such as the time until the interaction, a distance between the occupancy state locations and the state weights. In some examples, a state interaction score may decrease as the interaction time between the occupancy states is further in the future and as the distance between the occupancy state locations increases. Further, the state interaction score may decrease as the velocities associated with the occupancy states increases.

Generally, the state interaction score for an occupancy state pair, $(x_a, x_b)$, may be written as $r(d, t_a, t_b, w_{th}, w_b)$, where d may denote the distance between the states, $t_a$ and to may be the earliest arrival times to the respective locations of the occupancy states (e.g., the time until interaction), and $w_a$ and $w_b$ may be the state weights of the occupancy states.

In some examples, the state interaction score may be determined using the following function:

$$r(d, t_a, t_b, w_a, w_b) = \max(w_a, w_b) \times f(d, t_a, t_b) \text{ where}$$

$$f(d, t_a, t_b) = \frac{\max(0, d_{max} - d)}{d_{max}} \times \exp(-\alpha_a t_a - \alpha_b t_b)$$

Here, $d_{max}$ may denote the maximum distance between the two states to be considered as an interaction. The parameters $\alpha_a$ and $\alpha_b$ may be constant positive weights on interaction time.

In some examples, the vehicle computing system may further determine that the $t_{min}$ of one state is greater than the $t_{max}$ of the other state. In such a case, the vehicle computing system may determine the state interaction score to be zero (0).

At 316, the vehicle computing system may determine whether a pair of occupancy states remain which has not been processed for a state interaction score. If so, the process may return to 312. Otherwise, the process continues to 318.

At 318, the vehicle computing system may determine trajectory interaction scores for the predicted object trajectories. The trajectory interaction score may be used to quantify the impacts of one trajectory on another trajectory. In some examples, the trajectory interaction scores for m trajectories (e.g., both candidate trajectories and predicted object trajectories) may be recorded in a m×m table, where the element $S_{i,j}$ at the i-th row and the j-th column may denote the trajectory interaction score of trajectory j onto trajectory i. In some examples, the trajectory interaction score may be determined as or set to the highest state interaction score between the trajectories (e.g., between a predicted object trajectory and the candidate trajectory).

For example, the following function may be used to update a trajectory interaction score, $S_{i,j}$, between trajectories i and j after the determination of a state interaction score $r_{a,b}$ between the occupancy state pair $x_a$ and $x_b$ which belong to the trajectories i and j, respectively:

$$S_{i,j} \leftarrow \max(S_{i,j}, r_{a,b})$$

At 320, after the trajectory interaction table is generated, the vehicle computing system may calculate importance scores of the predicted object trajectories. For example, where the candidate trajectories may be indexed in the trajectory interaction table from 1 to N with a total of m trajectories, the importance scores for the predicted object trajectories i=N+1, . . . , m may be given by the function:

$$T_i = \max_{j=1, \dots, N} S_{i,j}$$

While not specifically illustrated, when determining an operational trajectory, some examples may select the predicted object trajectories with the highest importance score for the respective objects and include the selected predicted object trajectories in at least one scenario used in determining an operational trajectory.

While specific equations and tests are discussed above, these are merely examples, and many variations would be understood by one of ordinary skill in the art in view of this disclosure.

Figure 5:
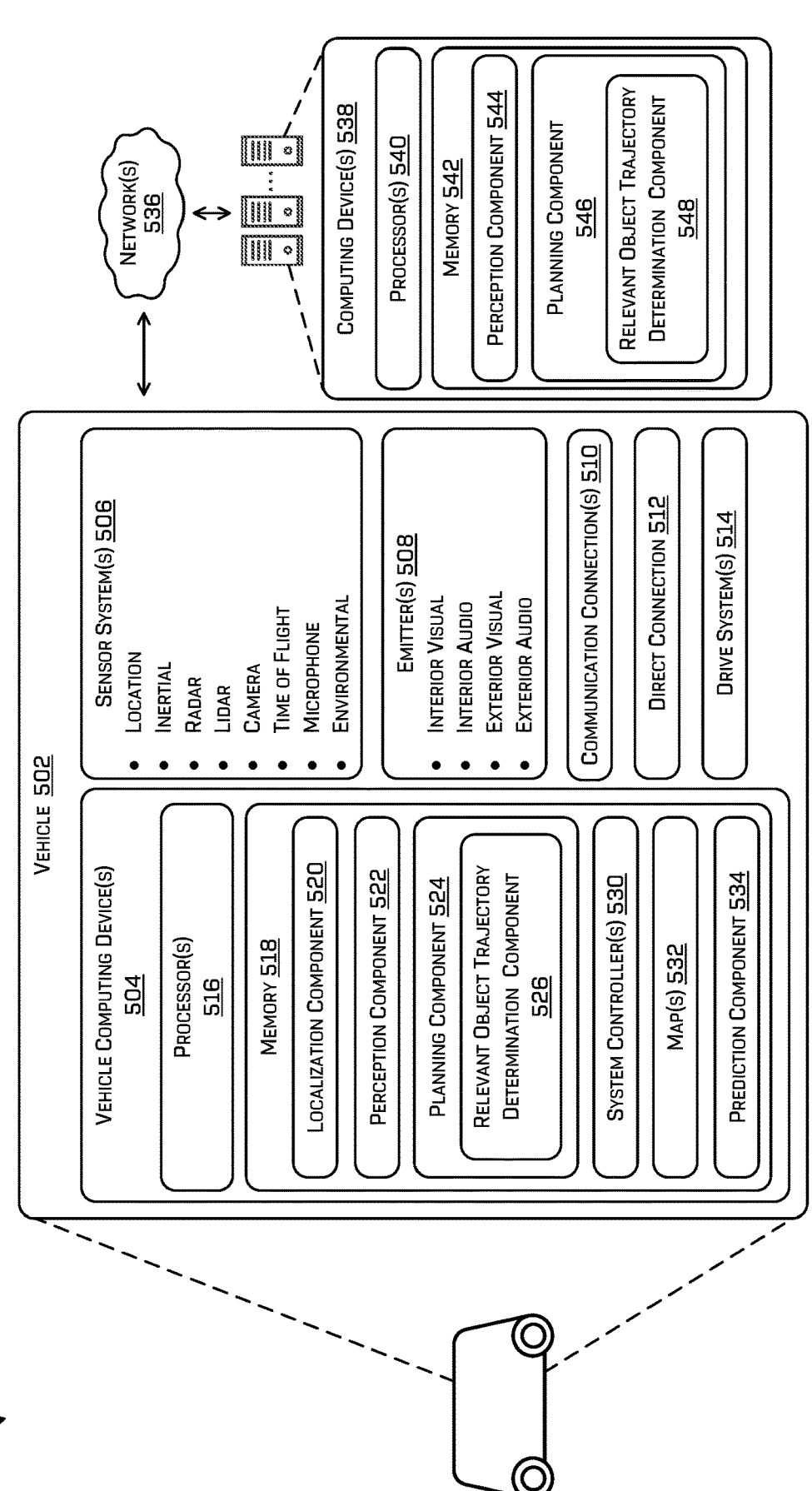
FIG. 5 depicts a block diagram of an example system for implementing various techniques described herein.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 530, one or more maps 532, a prediction component 534, and/or one or more relevant object trajectory determination components 526. Though depicted in FIG. 5 as residing in memory 518 for illustrative purposes, it is contemplated that each of the localization component 520, the perception component 522, the planning component 524, the one or more system controllers 530, the one or more maps 532, the prediction component 534, and/or the one or more relevant object trajectory determination components 526 can additionally, or alternatively, be accessible to the vehicle 502 (e.g., stored remotely). Alternatively or additionally, the one or more relevant object trajectory determination components 526 may be a component of and/or associated with a remote computing device and/or a separate (e.g., secondary) computing device.

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. The perception component 522 may use multichannel data structures, such as multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate. In some examples, the planning component 524 may include one or more relevant object trajectory determination components 526 that may be configured to perform one or more of the operations described herein to determine relevant predicted object trajectories for one or more candidate vehicle trajectories.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year, etc.). Storing multiple maps 532 can have similar memory requirements but increase the speed at which data in a map can be accessed.

In general, the prediction component 534 can generate predicted object trajectories of objects in an environment. For example, the prediction component 534 can generate one or more predicted object trajectories for vehicles, pedestrians, animals, and the like within a threshold distance from the vehicle 502. In some instances, the prediction component 534 can measure a trace of an object and generate a trajectory for the object based on observed and predicted behavior. The prediction component 534 may interact with the planning component 524 and/or the relevant object trajectory determination component 526 as described herein to determine relevant predicted object trajectories and an operational trajectory, for example, based on one or more candidate trajectories.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN). The CNN may include one or more convolution/deconvolution layers. Alternatively, or in addition, the relevant object trajectory determination component 526 may include or be implemented by a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 536, to the one or more computing device(s) at a particular frequency, after a lapse of a predetermined period of time, in near real-time, etc.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data, audio data, collision data, and/or other types of data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., multichannel data structures representing sensor data) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing one or more perception components 544, planning components 546, and/or a relevant object trajectory determination component 548. In some instances, the relevant object trajectory determination component 548 can substantially correspond to the relevant object trajectory determination component 526 and can include substantially similar functionality. In some instances, the planning component 546 can substantially correspond to the planning component 524 and can include substantially similar functionality.

The processor(s) 516 of the vehicle 502 and the processor(s) 540 of the computing device(s) 538 can be any suitable processor capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

Example Clauses

The following paragraphs describe various examples. Any of the examples in this section may be used with any other of the examples in this section and/or any of the other examples or embodiments described herein.

A: A system comprising: one or more processors; and one or more non-transitory computer-readable media storing computer-executable instructions that, when executed, cause the one or more processors to perform operations comprising: receiving sensor data associated with an environment; determining a set of actions for controlling a vehicle through the environment; detecting, based at least in part on the sensor data, an object within the environment; determining, based at least in part on the sensor data, a set of predicted object trajectories associated with the object; determining, based at least in part on an action of the set of actions, a plurality of vehicle occupancy states of the vehicle along a path of travel based at least in part by sampling the path of travel of the vehicle based on a length of the vehicle; determining, based at least in part on a predicted object trajectory of the set of predicted object trajectories, a plurality of object occupancy states of the object along the predicted object trajectory at least in part by sampling the predicted object trajectory based on a length of the object; determining a plurality of state interaction scores of state interactions between pairs of the plurality of vehicle occupancy states and the plurality of object occupancy states; determining a highest state interaction score of the plurality of state interaction scores; determining, based at least in part on the highest state interaction score, a relevancy score representing a relevance of the predicted object trajectory to a candidate trajectory; and controlling the vehicle based at least in part on the relevancy score.

B: The system of clause A, wherein determining a state interaction score of the plurality of state interaction scores for a vehicle occupancy state of the plurality of vehicle occupancy states and an object occupancy state of the plurality of object occupancy states is based at least in part on one or more of: a distance between a first location associated with the vehicle occupancy state and a second location associated with the object occupancy state; a time until an interaction associated with the vehicle occupancy state and the object occupancy state; or a state weight associated with the object occupancy state.

C. The system of one of clauses A or B, wherein determining the time until the interaction associated with the vehicle occupancy state and the object occupancy state is based at least in part on a maximum acceleration associated with the vehicle.

D. The system of one of clauses A-C, wherein determining the plurality of state interaction scores further comprises: determining a state interaction score between a pair of object occupancy states of the plurality of object occupancy states.

E. The system of one of clauses A-D, wherein the highest state interaction score is associated with a first vehicle occupancy state and a first object occupancy state and the operations further comprise: determining a trajectory interaction score for a first predicted object trajectory including the first vehicle occupancy state and the first object occupancy state based at least in part on the highest state interaction score, wherein the determining, based at least in part on the highest state interaction score, the relevancy score is based at least in part on the trajectory interaction score.

F. One or more non transitory computer readable media storing instructions executable by one or more processors, wherein the instructions, when executed, cause the one or more processors to perform operations comprising: receiving an action to control a vehicle through an environment; receiving a predicted object trajectory associated with an object proximate the vehicle; determining, based at least in part on the action, a vehicle occupancy state of the vehicle along a path of travel; determining, based at least in part on the predicted object trajectory, an object occupancy state of the object along the predicted object trajectory; determining a state interaction score of a state interaction between the vehicle occupancy state and the object occupancy state; determining, based at least in part on the state interaction score, a relevancy score representing a relevance of the predicted object trajectory to a candidate trajectory; and controlling the vehicle based at least in part on the relevancy score.

G. The one or more non transitory computer readable media of clause F, wherein determining the state interaction score is based at least in part on one or more of: a distance between a first location associated with the vehicle occupancy state and a second location associated with the object occupancy state; a time until an interaction associated with the vehicle occupancy state and the object occupancy state; or a state weight associated with the object occupancy state.

H. The one or more non transitory computer readable media of one of clauses F or G, wherein determining the time until the interaction associated with the vehicle occupancy state and the object occupancy state is based at least in part on a maximum acceleration associated with the vehicle.

I. The one or more non-transitory computer-readable media of one of clauses F-H, wherein the operations further comprise: determining a plurality of object occupancy states including the object occupancy state based at least in part by sampling the predicted object trajectory based on a length of the object; and determining a plurality of vehicle occupancy states including the vehicle occupancy state based at least in part by sampling the path of travel of the vehicle based on the length of the vehicle.

J. The one or more non transitory computer readable media of one of clauses F-I, wherein the operations further comprise: determining, for a plurality of combinations of the object occupancy states and the vehicle occupancy states, a plurality of state interaction scores; and determining a trajectory interaction score for the predicted object trajectory based at least in part on the state interaction scores of the object occupancy states associated with the predicted object trajectory, wherein the determining, based at least in part on the state interaction score, the relevancy score is based at least in part on the trajectory interaction score.

K. The one or more non transitory computer readable media of one of clauses F-J, wherein: determining the state interaction score is based at least in part on a state weight associated with the object occupancy state; and the state weight is based at least in part on a predicted velocity of the object.

L. The one or more non transitory computer readable media of one of clauses F-K, wherein determining the state interaction score for the vehicle occupancy state and the object occupancy state comprises determining the state interaction is irrelevant when a distance between a first location associated with the vehicle occupancy state and a second location associated with the object occupancy state is greater than a first threshold or when the state interaction score is less than a second threshold.

M. The one or more non transitory computer readable media of one of clauses F-L, wherein the action comprises one or more of: turn left, turn right, merge left, merge right, or continue along a path.

N. A method comprising: receiving an action to control a vehicle through an environment; receiving a predicted object trajectory associated with an object proximate the vehicle; determining, based at least in part on the action, a vehicle occupancy state of the vehicle along a path of travel; determining, based at least in part on the predicted object trajectory, an object occupancy state of the object along the predicted object trajectory; determining a state interaction score of a state interaction between the vehicle occupancy state and the object occupancy state, determining, based at least in part on the state interaction score, a relevancy score representing a relevance of the predicted object trajectory to a candidate trajectory; and controlling the vehicle based at least in part on the relevancy score.

O. The method of clause N, wherein determining the state interaction score is based at least in part on one or more of: a distance between a first location associated with the vehicle occupancy state and a second location associated with the object occupancy state; a time until an interaction associated with the vehicle occupancy state and the object occupancy state; or a state weight associated with the object occupancy state.

P. The method of one of clauses N or O, wherein determining the time until the interaction associated with the vehicle occupancy state and the object occupancy state is based at least in part on a maximum acceleration associated with the vehicle.

Q. The method of one of clauses N-P, further comprising: determining a plurality of object occupancy states including the object occupancy state based at least in part by sampling the predicted object trajectory based on a length of the object; and determining a plurality of vehicle occupancy states including the vehicle occupancy state based at least in part by sampling the path of travel of the vehicle based on the length of the vehicle.

R. The method of one of clauses N-Q, further comprising: determining, for a plurality of combinations of the object occupancy states and the vehicle occupancy states, a plurality of state interaction scores; and determining a trajectory interaction score for the predicted object trajectory based at least in part on the state interaction scores of the object occupancy states associated with the predicted object trajectory, wherein the determining, based at least in part on the state interaction score, the relevancy score is based at least in part on the trajectory interaction score.

S. The method of one of clauses N-R, wherein: determining the state interaction score is based at least in part on a state weight associated with the object occupancy state; and the state weight is based at least in part on a predicted velocity of the object.

T. The method of one of clauses N-S, wherein determining the state interaction score for the vehicle occupancy state and the object occupancy state comprises determining the state interaction is irrelevant when a distance between a first location associated with the vehicle occupancy state and a second location associated with the object occupancy state is greater than a first threshold or when the state interaction score is less than a second threshold.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
  receiving sensor data associated with an environment;
  determining a set of actions for controlling a vehicle through the environment;
  detecting, based at least in part on the sensor data, an object within the environment;
  determining, based at least in part on the sensor data, a set of predicted object trajectories associated with the object;
  determining, based at least in part on an action of the set of actions, a plurality of vehicle occupancy states of the vehicle along a path of travel based at least in part by sampling the path of travel of the vehicle based on a length of the vehicle;
  determining, based at least in part on a predicted object trajectory of the set of predicted object trajectories, a plurality of object occupancy states of the object along the predicted object trajectory at least in part by sampling the predicted object trajectory based on a length of the object;
  determining a plurality of state interaction scores of state interactions between pairs of the plurality of vehicle occupancy states and the plurality of object occupancy states, wherein determining a state interaction score of the plurality of state interaction scores for a vehicle occupancy state of the plurality of vehicle occupancy states and an object occupancy state of the plurality of object occupancy states is based at least in part on a time until an interaction associated with the vehicle occupancy state and the object occupancy state, wherein the time until the interaction is based at least in part on a maximum acceleration associated with the vehicle;
  determining a highest state interaction score of the plurality of state interaction scores;
  determining, based at least in part on the highest state interaction score, a relevancy score representing a relevance of the predicted object trajectory to a candidate trajectory; and
  controlling the vehicle based at least in part on the relevancy score.

2. The system of claim 1, wherein determining the state interaction score of the plurality of state interaction scores for the vehicle occupancy state of the plurality of vehicle occupancy states and the object occupancy state of the plurality of object occupancy states is further based at least in part on one or more of:
  a distance between a first location associated with the vehicle occupancy state and a second location associated with the object occupancy state;
  or
  a state weight associated with the object occupancy state.

3. The system of claim 1, wherein determining the plurality of state interaction scores further comprises:
  determining the state interaction score between a pair of object occupancy states of the plurality of object occupancy states.

4. The system of claim 1, wherein the highest state interaction score is associated with a first vehicle occupancy state and a first object occupancy state and the operations further comprise:
  determining a trajectory interaction score for a first predicted object trajectory including the first vehicle occupancy state and the first object occupancy state based at least in part on the highest state interaction score.

5. One or more non-transitory computer-readable media storing instructions executable by one or more processors, wherein the instructions, when executed, cause the one or more processors to perform operations comprising:
  receiving an action to control a vehicle through an environment;
  receiving a predicted object trajectory associated with an object proximate the vehicle;
  determining, based at least in part on the action, a vehicle occupancy state of the vehicle along a path of travel;
  determining, based at least in part on the predicted object trajectory, an object occupancy state of the object along the predicted object trajectory;
  determining, based at least in part on a time until an interaction associated with the vehicle occupancy state and the object occupancy state, a state interaction score of a state interaction between the vehicle occupancy state and the object occupancy state, wherein the time until the interaction is based at least in part on a maximum acceleration associated with the vehicle;
  determining, based at least in part on the state interaction score, a relevancy score representing a relevance of the predicted object trajectory to a candidate trajectory; and
  controlling the vehicle based at least in part on the relevancy score.

6. The one or more non-transitory computer-readable media of claim 5, wherein determining the state interaction score is further based at least in part on one or more of:
  a distance between a first location associated with the vehicle occupancy state and a second location associated with the object occupancy state;
  or
  a state weight associated with the object occupancy state.

7. The one or more non-transitory computer-readable media of claim 5, wherein the operations further comprise:
  determining a plurality of object occupancy states including the object occupancy state based at least in part by sampling the predicted object trajectory based on a length of the object; and
  determining a plurality of vehicle occupancy states including the vehicle occupancy state based at least in part by sampling the path of travel of the vehicle based on the length of the vehicle.

8. The one or more non-transitory computer-readable media of claim 7, wherein the operations further comprise:
  determining, for a plurality of combinations of the object occupancy states and the vehicle occupancy states, a plurality of state interaction scores; and
  determining a trajectory interaction score for the predicted object trajectory based at least in part on the state interaction scores of the object occupancy states associated with the predicted object trajectory.

9. The one or more non-transitory computer-readable media of claim 5, wherein:

US 12,649,463 B1

27 determining the state interaction score is based at least in part on a state weight associated with the object occupancy state; and the state weight is based at least in part on a predicted velocity of the object.

10. The one or more non-transitory computer-readable media of claim 5, wherein determining the state interaction score for the vehicle occupancy state and the object occupancy state comprises determining the state interaction is irrelevant when a distance between a first location associated with the vehicle occupancy state and a second location associated with the object occupancy state is greater than a first threshold or when the state interaction score is less than a second threshold.

11. The one or more non-transitory computer-readable media of claim 5, wherein the action comprises one or more of:
turn left,
turn right,
merge left,
merge right, or
continue along a path.

12. A method comprising:
receiving an action to control a vehicle through an environment;
receiving a predicted object trajectory associated with an object proximate the vehicle;
determining, based at least in part on the action, a vehicle occupancy state of the vehicle along a path of travel;
determining, based at least in part on the predicted object trajectory, an object occupancy state of the object along the predicted object trajectory;
determining, based at least in part on a time until an interaction associated with the vehicle occupancy state and the object occupancy state, a state interaction score of a state interaction between the vehicle occupancy state and the object occupancy state, wherein the time until the interaction is based at least in part on a maximum acceleration associated with the vehicle;
determining, based at least in part on the state interaction score, a relevancy score representing a relevance of the predicted object trajectory to a candidate trajectory; and

28 controlling the vehicle based at least in part on the relevancy score.

13. The method of claim 12, wherein determining the state interaction score is further based at least in part on one or more of:
a distance between a first location associated with the vehicle occupancy state and a second location associated with the object occupancy state;
or
a state weight associated with the object occupancy state.

14. The method of claim 12, further comprising:
determining a plurality of object occupancy states including the object occupancy state based at least in part by sampling the predicted object trajectory based on a length of the object; and
determining a plurality of vehicle occupancy states including the vehicle occupancy state based at least in part by sampling the path of travel of the vehicle based on the length of the vehicle.

15. The method of claim 14, further comprising:
determining, for a plurality of combinations of the object occupancy states and the vehicle occupancy states, a plurality of state interaction scores; and
determining a trajectory interaction score for the predicted object trajectory based at least in part on the state interaction scores of the object occupancy states associated with the predicted object trajectory.

16. The method of claim 12, wherein:
determining the state interaction score is based at least in part on a state weight associated with the object occupancy state; and
the state weight is based at least in part on a predicted velocity of the object.

17. The method of claim 12, wherein determining the state interaction score for the vehicle occupancy state and the object occupancy state comprises determining the state interaction is irrelevant when a distance between a first location associated with the vehicle occupancy state and a second location associated with the object occupancy state is greater than a first threshold or when the state interaction score is less than a second threshold.

* * * * *